United States Patent [19]
Fu et al.

[11] Patent Number: 5,624,489
[45] Date of Patent: Apr. 29, 1997

[54] CONVERSION-PREVENTING ADDITIVE FOR HIGH ALUMINA CEMENT PRODUCTS

[75] Inventors: Yan Fu; Jian Ding, both of Hull; James J. Beaudoin, Gloucester, all of Canada

[73] Assignee: National Research Council of Canada, Ottawa, Canada

[21] Appl. No.: 377,109

[22] Filed: Jan. 23, 1995

[51] Int. Cl.$^6$ .................................................. C04B 7/32
[52] U.S. Cl. ..................... 106/692; 106/693; 106/695; 106/705; 106/DIG. 1
[58] Field of Search ........................ 106/692, 693, 106/DIG. 1, 705, 695, 696

[56] References Cited

U.S. PATENT DOCUMENTS

| | | | |
|---|---|---|---|
| 4,455,171 | 6/1984 | Spensley et al. | 106/694 |
| 4,961,787 | 10/1990 | Majumdar et al. | 106/692 |
| 4,997,484 | 3/1991 | Gravitt et al. | 106/DIG. 1 |
| 5,073,197 | 12/1991 | Majumdar et al. | 106/693 |
| 5,236,501 | 8/1993 | Nomachi et al. | 106/723 |
| 5,346,550 | 9/1994 | Kungi et al. | 106/DIG. 1 |
| 5,374,308 | 12/1994 | Kirkpatrick et al. | 106/DIG. 1 |
| 5,378,279 | 1/1995 | Conroy | 106/719 |
| 5,458,195 | 10/1995 | Totten et al. | 106/724 |

FOREIGN PATENT DOCUMENTS

0310716  12/1988  Japan .............................. 106/DIG. 1

*Primary Examiner*—Paul Marcantoni
*Attorney, Agent, or Firm*—Juliusz Szereszewski

[57] ABSTRACT

Additives for high alumina cement compositions are proposed. The additives are effective to reduce or prevent the deleterious conversion of hexagonal calcium aluminate hydrates to cubic hydrogarnet in the high alumina cement compositions. The additives comprise 80–99 wt. % of a siliceous pozzolan and 1–20 wt. % of an inorganic sodium or potassium salt.

8 Claims, 6 Drawing Sheets

X-ray Diffraction Degree (2θ)

CONVERSION-PREVENTING ADDITIVE FOR HIGH ALUMINA CEMENT PRODUCTS

BACKGROUND OF THE INVENTION

1. Field of Invention

The present invention relates to a method of preventing strength reduction due to phase conversion in high alumina cement products, and more particularly, to a method of preventing hydrogarnet ($C_3AH_6$) formation and promoting strätlingite ($C_2ASH_8$) formation in high alumina cement products by adding a novel conversion-preventing additive to high alumina cement compositions; the invention further relates to the novel conversion-preventing additives, to blended high alumina cement compositions (products) containing said conversion-preventing additive, and to a method for pre-treatment of natural zeolite for use in the conversion-preventing additives.

2. Description of Prior Art

High alumina cement (HAC) was invented in 1908 by J. Bied, a director of the Pavin de Lafarge company, France (see French patents 320290 and 391454 to J. Bied). Spackman was the first to obtain a U.S. patent for this material (see, Proc. Amer. Soc. Test. Mater. 10, 315, 1910, H. S. Spackman). Commercial HAC was produced by the Lafarge company in 1913. This cement is based upon calcium monoaluminate (CA). Hydration of CA eventually results in the formation of cubic hydrogarnet ($C_3AH_6$) crystalline phase, a thermodynamically stable aluminate hydrate. High early strength, good chemical resistance and high temperature resistance of HAC products has encouraged the use of high alumina cement concrete in certain construction engineering applications. However, conversion of hexagonal calcium aluminate hydrates ($CAH_{10}$ or $C_2AH_8$) to cubic hydrogarnet ($C_3AH_6$) in hydrated HAC concrete under certain temperature conditions has been a major problem limiting its use. The conversion process results in a densification of over 50%. Consequently, a significant reduction of strength during the service life of the concrete occurs. Many high alumina cement concrete structures built in the UK in the 1940's and 1950's collapsed due to later conversion. As a direct result of those investigations, the British government issued a document on Jul. 20, 1974, Ref. BRA. 1068/2, entitled "High Alumina Cement Concrete in Buildings". This document stated that "high alumina cement should not be used for structural work in buildings until further notice". The application of high alumina cement in structural members has been banned in virtually every country in the world.

The conversion process in HAC systems has been extensively studied for decades. A HAC-based blended cement containing about equal amount by weight of granulated blast-furnace slag (GBS) was commercialized by the British Research Establishment (BRE) under the trademark "BRECEM". It was touted as a possible solution for prevention of the conversion reaction (Majumdar, A. J., et al., Cem. Concr. Res., 19, p.779, 1989; 20, p.197, 1990; 22, p.1101, 1992; 24, p.335, 1994). This effect was attributed to strätlingite formation in preference to the hydrogarnet. Other pozzolanic additives such as silica fume and fly ash have also been reported to favour the formation of strätlingite.

The early strength of such material is significantly reduced as a great amount of HAC is replaced by granulated blast-furnace slag. The strength slowly increases to a value approaching the one-day strength of HAC concrete at 1–2 years when water-cured at 20° C. Hydrogarnet was still formed at 38° C. although the HAC-slag blended cement concrete had no strength reduction. Lafarge Calcium Aluminates, Virginia, USA, concluded that "The approach to aluminous cement concrete that seeks to avoid conversion is unrealistic" (See, "Calcium Aluminate Cements", Chapman and Hall, New York, p. 206, C. M. George, 1990).

A new cement resulting in direct formation of stable hydrogarnet and strätlingite phase by fusing limestone, alumina, and silica sand and quenching the resulting glass was described in U.S. Pat. No. 4,605,443 issued 1986 to J. F. MacDowell. This direct hydration avoids the formation of metastable hydrates that gradually react to weaken the calcium aluminate cement system during conversion. According to that patent, a predominantly hydrogarnet paste had compressive strength between 35 and 70 MPa, and 20–35% porosity. The strätlingite-rich paste had strength between 70 and 140 MPa and 1–10% porosity. Also according to that patent, the cement had fast hardening characteristics and good thermal and chemical stability similar to high alumina cement. High strength developed during the first 24 hours and then remained constant or decreased slightly. The application of this technology was reported to be delayed. The delay was attributed to the high melting temperatures required and the lack of knowledge of relevant engineering properties.

SUMMARY OF THE INVENTION

It is an object of this invention to provide a method for preventing strength reduction due to conversion from hexagonal calcium aluminate hydrates to cubic tricalcium aluminate hydrates in high alumina cement-based products.

It is another object of this invention to provide a conversion-preventing additive for high-alumina cement-based compositions, the additive comprising:

siliceous pozzolanic powder, e.g. zeolite, granulated blast-furnace slag, fly ash, silica fume, rice hulls, metakaolin, inorganic salts containing sodium or potassium cations and sulphate, carbonate, nitrate, silicate, phosphate, chloride or bromide anions, and optionally other chemical admixtures, e.g. superplasticizers.

It is yet another object of this invention to provide a novel blended high alumina cement composition containing high alumina cement and said conversion-preventing additive.

It is a further object of this invention to provide blended high alumina cement compositions (containing the above-defined additives) having compressive strength in the range of 35–65 MPa at one-day hydration age and substantially no strength reduction due to conversion of hexagonal calcium aluminate hydrates to cubic hydrogarnet.

It is yet another object of this invention to provide a method for pre-treatment of natural zeolite for use in production of the conversion-preventing additive and thus in blended high alumina cement compositions (products) of the invention.

According to one aspect of the invention, there is provided a method of preventing strength reduction due to conversion from hexagonal calcium aluminate hydrates to cubic tricalcium aluminate hydrates in high alumina cement compositions comprising high alumina cement, the method comprising, mixing a conventional high alumina cement composition with a conversion-preventing additive which comprises 80–99 wt. % of a siliceous pozzolan and 1–20 wt. % of at least one inorganic salt having sodium or potassium cation and an anion selected from the group consisting of sulfate, carbonate, nitrate, silicate, phosphate, chloride, and bromide.

According to another aspect of the invention, there is provided a conversion-preventing additive for high alumina cement products which comprises 80–99 wt. % siliceous pozzolan and 1–20 wt. % of at least one inorganic salt having a sodium or potassium cation and an anion selected from the group consisting of sulfate, carbonate, nitrate, silicate, phosphate, chloride, and bromide.

According to still another aspect of the invention, there are provided high alumina cement compositions obtained by the above-defined method, the compositions comprising high alumina cement, the above-defined additive in an amount from about 10% to about 100% by weight of the high alumina cement, water and optionally chemical admixtures to improve or modify the properties of uncured and/or cured compositions. Preferably, the content of the additives should be from about 10% to about 20% by weight of the High alumina cement.

BRIEF DESCRIPTION OF THE DRAWINGS

The invention will now be described in more detail by way of the following description to be taken in conjunction with the drawings in which.

DESCRIPTION OF THE INVENTION

This invention describes the use of siliceous pozzolanic materials, e.g. zeolite, granulated blast-furnace slag, fly ash, silica fume, rice hull ash, metakaolin, etc.; inorganic salts containing sodium or potassium cations and sulphate, carbonate, nitrate, silicate, phosphate, chloride, or bromide anion; and other chemical admixtures, in high alumina cement as additives to prevent strength reduction due to the conversion from hexagonal calcium aluminate hydrates ($CAH_{10}$ or $C_2AH_8$) to cubic hydrogarnet ($C_3AH_6$).

A pozzolan is an inorganic material, either naturally occurring or an industrial by-product, which consists principally of chemically reactive siliceous or siliceous and aluminous compounds and which, in the presence of moisture, is capable of reacting with lime (calcium hydroxide, $Ca(OH)_2$), to form a hardened mass of calcium silicate hydrates, calcium aluminate hydrates and calcium silicoaluminate hydrates.

Zeolites are framework aluminosilicates; their structure consists of a three-dimensional framework of $SiO_4$ and $AlO_4$ tetrahedra. Compositionally, zeolites may be given the general formula:

$$(M^+_2, M^{2+})O \cdot Al_2O_3 \cdot gSiO_2 \cdot zH_2O$$

where $M^+$ is usually Na or K; $M^{2+}$ is Mg, Ca, or Fe.

Research by Lafarge Special Cements, UK, and Lafarge Coppée Recherche, France, indicated that hexagonal calcium aluminate hydrates $CAH_{10}$ and $C_2AH_8$ can not stably exist in high alumina cement products at temperatures above 25° and 30° C. respectively. Conversion from $CAH_{10}$ and $C_2AH_8$ to cubic hydrogarnet $C_3AH_6$ is accelerated at 30°–45° C. This temperature range also favours formation of strätlingite, $C_2ASH_8$ (see "The effect of curing conditions on the hydration and strength development in Fondu : Slag", Calcium Aluminate Cements, Chapman and Hall, New York, USA, C. H. Fentiman et al., 1990). It has been confirmed that water curing is a more favorable condition for conversion than moist curing at high humidity for high alumina cement products (see, "The chemistry of cement and concrete", Edward Arnold Ltd., London, UK, to F. M. Lea, 1956).

Water curing at 38° C. was the primary condition used for much of the work described in this invention. It is believed that the 38° C. is a critical condition for the conversion reaction in HAC structural products. For the purpose of the invention, any normal curing temperature can be used, but certainly temperatures above about 40° C. are not realistic.

Ciment Fondu, the high alumina cement, was supplied by Lafarge Calcium Aluminates, Virginia, USA.

X-ray diffraction analysis of high alumina cement pastes containing 10–30 wt. % siliceous pozzolan, e.g., natural zeolites from four different sources, synthetic zeolite, granulated blast-furnace slag, fly ash, silica fume and diatomaceous earth, showed that all these siliceous pozzolans could delay the conversion. The water/solid (HAC and pozzolan) ratio for the cement paste was 0.6. Hydrogarnet ($C_3AH_6$) was recorded at 24 hours hydration in plain (containing no pozzolans) high alumina cement paste. Its characteristic peak height quickly increased to a stable value at 3 days. Hydrogarnet could not be detected at 24 hours in the high alumina cement paste containing siliceous pozzolans. It was apparently formed, however, at 3 days for most samples and its XRD (X-ray diffraction) peak height also quickly increased and reached a constant value at about 7 days. Conversion in high alumina cement pastes containing the natural zeolite from Western Canada, or Type 13X synthetic molecular sieve was significantly delayed occurring at about 20 days hydration. Hydrogarnet was then quickly formed. No strätlingite formation was found in most of the samples except the sample containing granulated blast-furnace slag, silica fume or Type 13X synthetic molecular sieve; strätlingite and hydrogarnet co-existed after 3 days hydration. Strätlingite formation was apparently accelerated by the increase of slag content. Strätlingite was detected in the paste with HAC:Slag=1:1 to 1:3 at 24 hours hydration. These results are consistent with early research (see, "The chemistry of cements", Academic, Press, London, H. F. W. Taylor, 1964).

Cement mortar specimens (50×50×50 mm) with cement/sand ratio 2.75 and water/solid (HAC and pozzolan) ratio 0.4 were used for determination of compressive strength. River sand passing No.6 mesh sieve was employed. The specimens were moist-cured at 23° C. for 24 hours after casting. The one-day compressive strength was measured after demoulding. Companion specimens were then cured in water at 38° C. The average compressive strength of plain high alumina cement mortar was about 65 MPa after 24 hours moist-curing at 23° C. Strength then decreased to about 75% and 50% of the one-day strength after 7 and 14 days water-curing at 38° C. respectively. A slight change in strength occurred after 14 days. The compressive strength of HAC mortar containing 5–30 wt. % siliceous pozzolan, e.g., natural zeolites from four different sources, synthetic zeolite, granulated blast-furnace slag, fly ash, was in the range 40–60 MPa after 24 hours moist-curing at 23° C. except using silica fume and diatomaceous earth. The strength for most of the specimens containing different pozzolans was in the vicinity of one-day strength after 7 days' water curing at 38° C. It, however, dropped significantly to about 50% of the one-day strength at 14 days. Strength reduction after 14 days was also minimal. Difference in strength characteristics is dependent on the type of pozzolan. For instance, a natural zeolite from Western Canada, has a very low water requirement for the same workability. The use of this zeolite in HAC mortar can reduce the water requirement for the same flow value by 10% (flow table test, ASTM C230-90). This would result in about a 20% increase of one-day compressive strength compared with specimens containing other type of zeolites. This strength value could be maintained for 14 days in water at 38° C.; a decrease to 70% of its one-day strength would then occur.

Inorganic salts were widely studied in the present research as agents to prevent hydrogarnet formation. It has been found that in the presence of sodium ions, crystallization of hexagonal strätlingite plates in hydrated high alumina cement systems containing pozzolans is significantly accelerated. Its amount is greatly increased. Sodium ions appear to play a significant role in strätlingite formation in HAC-pozzolan systems. It is proposed that crystallization of strätlingite results from the reaction between $CAH_{10}$ or $C_2AH_8$ and dissolved silica. Sodium ions promote increased dissolution of silica required for strätlingite formation. Hydration of pozzolans in HAC paste without addition of sodium salt is relatively slow. Strätlingite nucleation and crystallization appear to be dependent on the dissolved silica concentration in the HAC-microsilica system.

Potassium ions are expected to perform in the same manner as sodium ions because of a similar chemical nature of potassium and sodium. This has been validated by tests reported herein.

Strätlingite is preferentially formed from hexagonal calcium aluminate hydrates and anhydrous high alumina cement at high temperature (e.g. 35°–45° C.). Conversion of those hydrates or anhydrates to hydrogarnet is prevented. Some anions such as sulphate, silicate, phosphate, carbonate, etc., also play an important role in preventing the conversion. This is a result of two primary reactions: (1) reaction of these anions with calcium ions to form insoluble calcium salts such as gypsum; the calcium concentration in the hydration system is significantly reduced and delays calcium dependent hydrogarnet formation; (2) substitution of sulphate in strätlingite-sulphate can be found in the strätlingite plates in high alumina cement paste containing sodium sulphate and zeolite, indicating that sulphate plays a role in the crystallization of strätlingite. This confirms the postulation cited by F. M. Lea ("Chemistry of cement and concrete", Edward Arnold Ltd., London, UK, 1956) that sulphate may be combined in strätlingite resulting in crystals having the formula $9CaO \cdot 4SiO_2 \cdot Al_2O_3 \cdot 7CaSO_4 \cdot 80H_2O$. The substitution of sulphate may reduce the crystallization energy of strätlingite plates and accelerate its formation. A large amount of preferentially formed strätlingite in high alumina cement system makes hydrogarnet formation unlikely. This process prevents strength reduction of the high alumina cement products due to the conversion.

X-ray diffraction (XRD) analyses were carried out on high alumina cement pastes containing siliceous pozzolans, e.g. zeolite, granulated blast-furnace slag, fly ash, silica fume, and different salts in amounts of 0.3–1.5% alkali ions by weight of high alumina cement, e.g. sodium sulphate, sodium carbonate, sodium nitrate, sodium silicate, sodium phosphate, sodium chloride, sodium bromide, potassium sulphate, potassium carbonate, aluminum sulphate, and copper sulphate. In general, strätlingite could be found in samples containing zeolite or granulated blast-furnace slag and sodium salts after 24 hours hydration. The peak heights at d-spacing 1.258 nm for the samples containing sodium or potassium salts were at least three times as high as that of the paste containing 50 wt. % high alumina cement and 50 wt. % granulated blast-furnace slag but without salts. The peak height of strätlingite quickly increased in the first 7 days and then reached an equilibrium value. Very little hydrogarnet phase could be found in the high alumina cement pastes containing zeolite or granulated blast-furnace slag, and sodium sulphate, sodium carbonate, sodium chloride, sodium nitrate, or sodium bromide when water-cured at 38° C. Potassium sulphate, aluminum sulphate, potassium carbonate or copper sulphate delayed hydrogarnet formation in HAC-zeolite pastes for 3–7 days and then hydrogarnet formed quickly to reach a maximum value at 21 days. Strätlingite formation in the HAC paste containing fly ash or silica fume and sodium salts was apparently slower than those containing zeolite and slag. Strätlingite was formed mostly at about 14 days. Little change in the XRD peak height of strätlingite in HAC/fly ash or HAC/silica fume compositions was found after 21 days and the peak height value was similar to the pastes containing zeolite.

The strength development of high alumina cement mortar (HAC/sand=2.75; water/solid=0.4; where solid is HAC and a siliceous material) was also studied. The strength characteristics of the HAC-mortar compositions corresponded with the development of phase composition in the mortar. The compressive strength continually increased with hydration at 38° C. when hydrogarnet formation was limited. It, however, dramatically decreased when hydrogarnet formation took place. No strength reduction was found in the HAC mortars containing 10–30% siliceous materials, e.g. zeolite, granulated blast-furnace slag, fly ash, silica fume, and 1–5% sodium salts, e.g. sodium sulphate, sodium carbonate, water-cured at 38° C., by weight of high alumina cement. The one-day compressive strengths of the HAC mortars (solid/sand=2.75; water/solid=0.4; where solid is HAC and siliceous material) containing different siliceous materials and sodium salts after 24 hours moist-curing at 23° C. were in the range of 35–65 MPa. The 28-day compressive strength was about 105–150% of the one-day compressive strength for the mortars containing different siliceous materials or different sodium salts. The one-day strength of the HAC mortar for similar addition of sodium sulphate depended on the different type of siliceous materials. The use of zeolite resulted in a higher one-day strength than the other pozzolans and a higher strength gain (above 30%) at 14 days. Granulated blast-furnace slag had a similar effect on strength of the compositions as zeolite. The use of fly ash or silica fume generally resulted in lower early strength values at 24 hours hydration. The rate of strength increase for the HAC mortar containing silica fume was about 15% higher than that in fly ash-HAC mortar during 14 days hydration. The one-day compressive strength of the fly ash mortar was about 60% higher than the silica fume mortar. The use of diatomaceous earth in HAC mortar resulted in a low strength value less than 20 MPa due to high water requirement for workability.

Various methods of pre-treatment of zeolite for use in the additives of the invention were also studied. Calcination of zeolite at temperatures of 650°–1000° C., preferably at about 700°–900° C., for 1–3 hours was found effective in improving the workability of cement mortar or concrete when such zeolite was used. The minimum calcination temperature, 650° C., is dictated by the need to avoid generation of air bubbles from zeolite during the subsequent mixing of concrete.

It was found that calcination did not have a similar effect on the other pozzolans used according to the present invention.

EXAMPLES

Example 1

Figure 1:
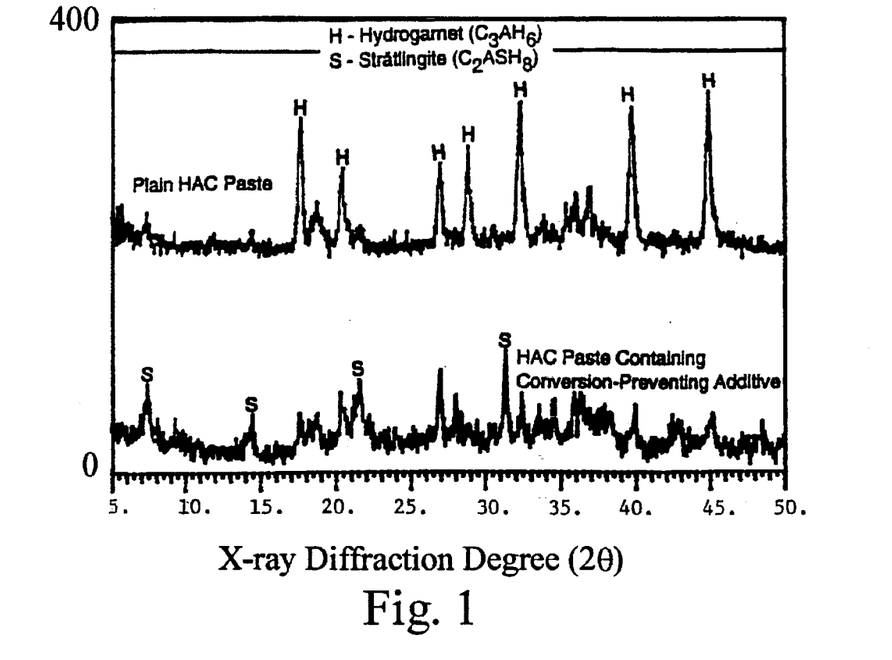
FIGS. 1–10 illustrate X-ray diffraction (XRD) spectra of exemplary samples of compositions of the invention, the samples described in Examples 1–10 respectively.

A cement paste comprising 46.6 wt. % high alumina cement, 14.0 wt. % natural zeolite from Western Canada, 2.2 wt. % sodium sulphate and 37.2 wt. % water was water-cured at 38° C. X-ray diffraction analysis was carried out on the wet sample at 60-day hydration. Strong characteristic peaks of strätlingite (S) and very weak hydrogarnet ($C_3AH_6$) peaks (H) were detected as shown in the XRD spectra shown in FIG. 1.

Example 2

Figure 2:
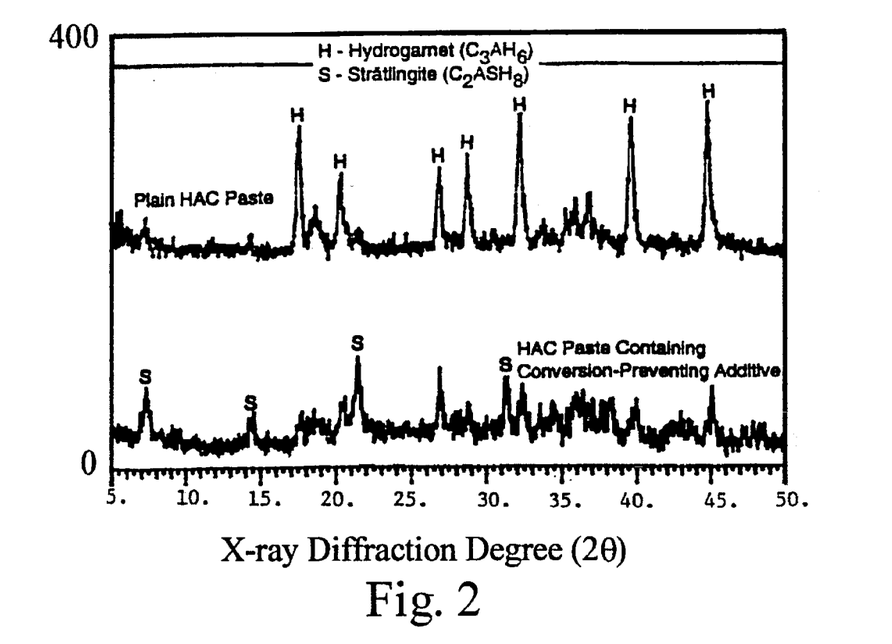

A cement paste comprising 50.7 wt. % high alumina cement, 10.1 wt. % calcined zeolite from Western Canada, 2.4 wt. % sodium sulphate and 36.8 wt. % water was water-cured at 38° C. The zeolite was calcined at 800° C. for 2 hours. X-ray diffraction analysis was carried out on the wet sample at 60-day hydration. Strong characteristic peaks of strätlingite and very weak hydrogarnet ($C_3AH_6$) peaks were detected as shown in the XRD spectra of FIG. 2.

Example 3

Figure 3:
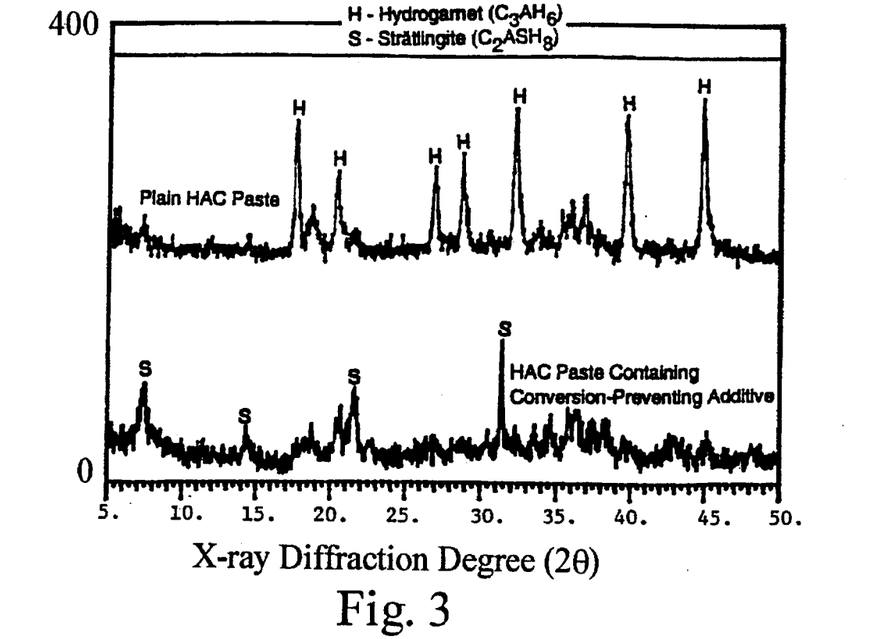

A cement paste comprising 50.7 wt. % high alumina cement, 10.1 wt. % natural zeolite from New Mexico, USA, 2.4 wt. % sodium sulphate and 36.8 wt. % water was water-cured at 38° C. X-ray diffraction analysis was carried out on the wet sample at 60-day hydration. Strong characteristic peaks of strätlingite and little hydrogarnet ($C_3AH_6$) peaks were detected as shown in the XRD spectra of FIG. 3.

Example 4

Figure 4:
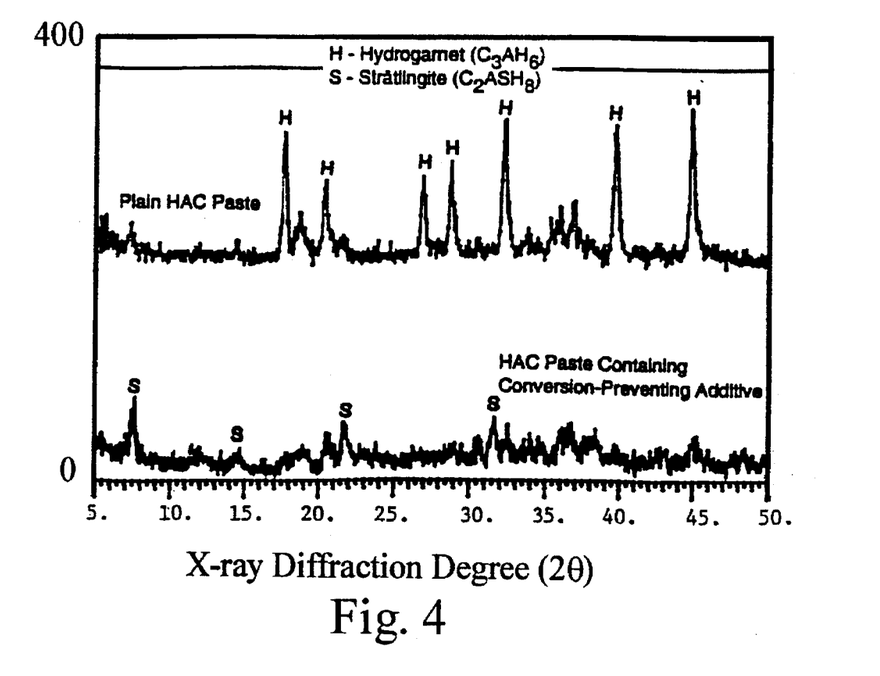

A cement paste comprising 51.0 wt. % high alumina cement, 10.2 wt. % natural zeolite from New Mexico, USA, 1.8 wt. % sodium carbonate and 37.0 wt. % water was water-cured at 38° C. X-ray diffraction analysis was carried out on the wet sample at 60-day hydration. Strong characteristic peaks of strätlingite and very weak hydrogarnet ($C_3AH_6$) peaks were detected as shown in the XRD spectra of FIG. 4.

Example 5

Figure 5:
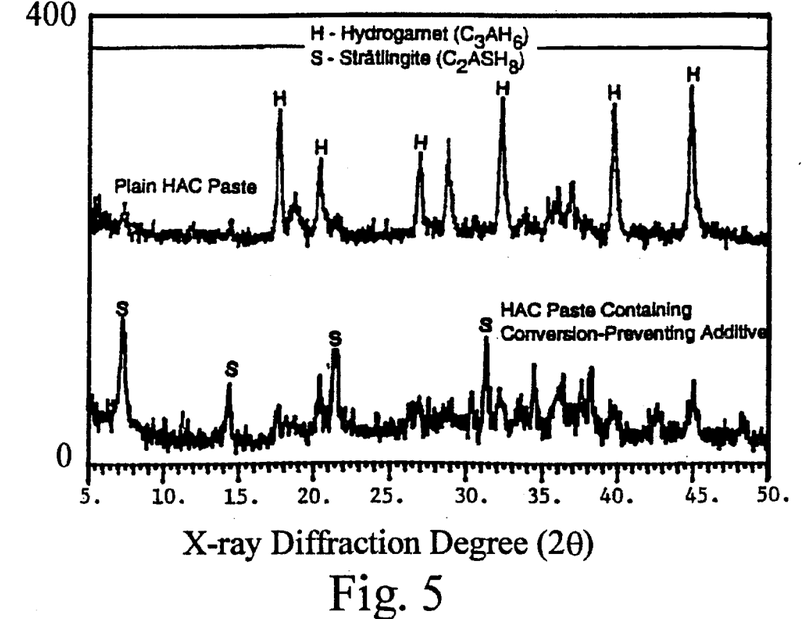

A cement paste comprising 50.4 wt. % high alumina cement, 10.1 wt. % natural zeolite from New Mexico, USA, 2.9 wt. % sodium nitrate and 36.6 wt. % water was water-cured at 38° C. X-ray diffraction analysis was carried out on the wet sample at 60-day hydration. Strong characteristic peaks of strätlingite and little hydrogarnet ($C_3AH_6$) peaks were detected as shown in the XRD spectra of FIG. 5.

Example 6

Figure 6:
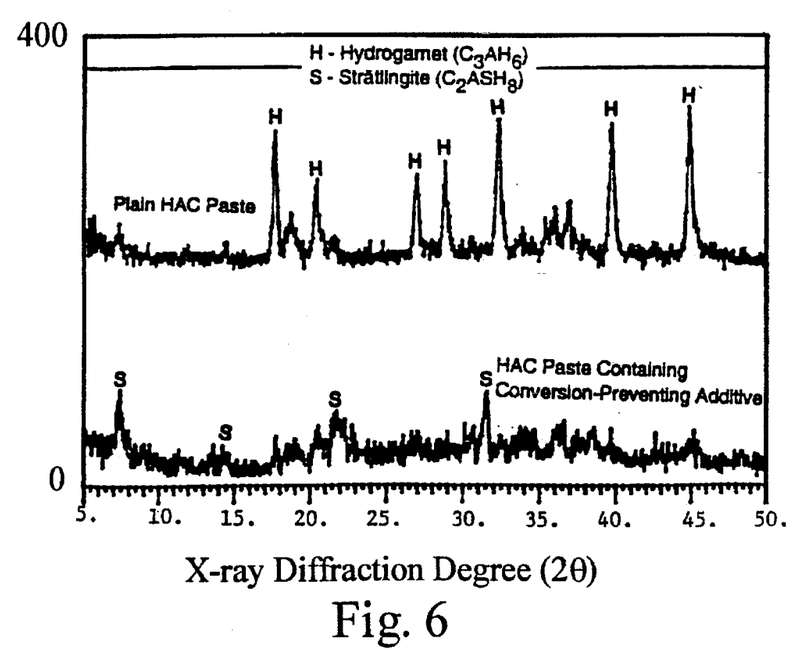

A cement paste comprising 50.9 wt. % high alumina cement, 10.2 wt. % natural zeolite from New Mexico, USA, 2.0 wt. % sodium chloride and 36.9 wt. % water was water-cured at 38° C. X-ray diffraction analysis was carried out on the wet sample at 60-day hydration. Strong characteristic peaks of strätlingite and little hydrogarnet ($C_3AH_6$) peaks were detected as shown in the XRD spectra of FIG. 6.

Example 7

Figure 7:
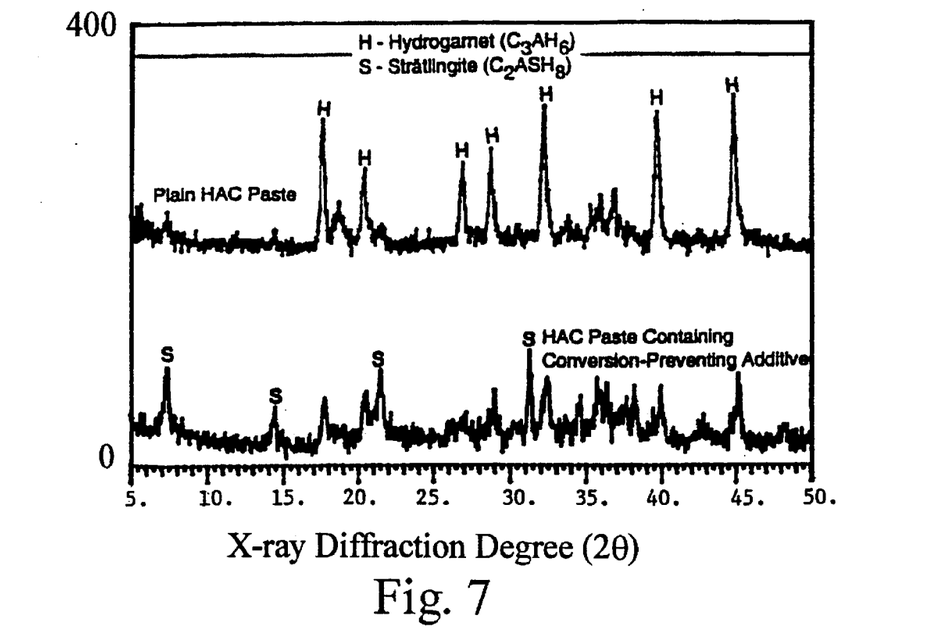

A cement paste comprising 46.6 wt. % high alumina cement, 14.0 wt. % granulated blast-furnace slag, 2.2 wt. % sodium sulphate and 37.3 wt. % water was water-cured at 38° C. X-ray diffraction analysis was carried out on the wet sample at 60-day hydration. Very strong characteristic peaks of strätlingite and small hydrogarnet ($C_3AH_6$) peaks were detected as shown in the XRD spectra of FIG. 7.

Example 8

Figure 8:
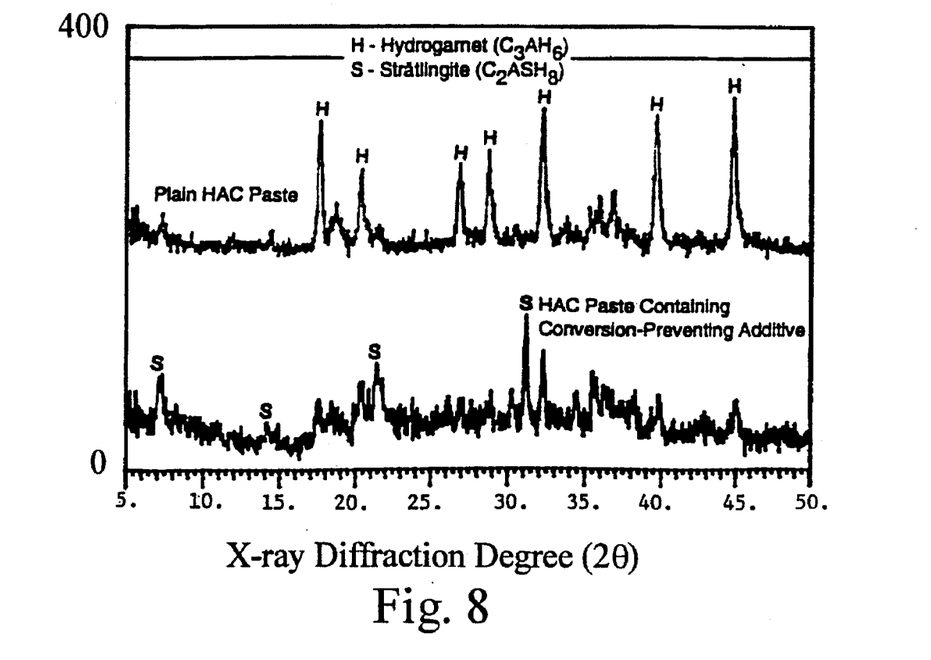

A cement paste comprising 50.7 wt. % high alumina cement, 10.1 wt. % Type C fly ash, 2.4 wt. % sodium sulphate and 36.8 wt. % water was water-cured at 38° C. X-ray diffraction analysis was carried out on the wet sample at 60-day hydration. Strong characteristic peaks of strätlingite and weak hydrogarnet ($C_3AH_6$) peaks were detected as shown in the XRD spectra of FIG. 8.

Example 9

Figure 9:
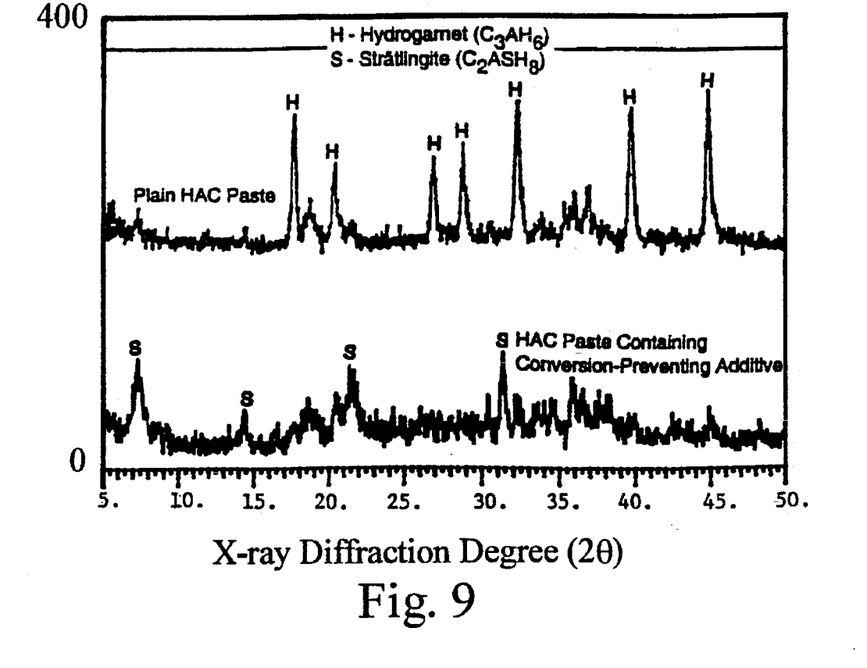

A cement paste comprising 50.7 wt. % high alumina cement, 10.1 wt. % silica fume, 2.4 wt. % sodium sulphate and 36.8 wt. % water was water-cured at 38° C. X-ray diffraction analysis was carried out on the wet sample at 60-day hydration. Strong characteristic peaks of strätlingite and weak hydrogarnet ($C_3AH_6$) peaks were detected as shown in the XRD spectra of FIG. 9.

Example 10

Figure 10:
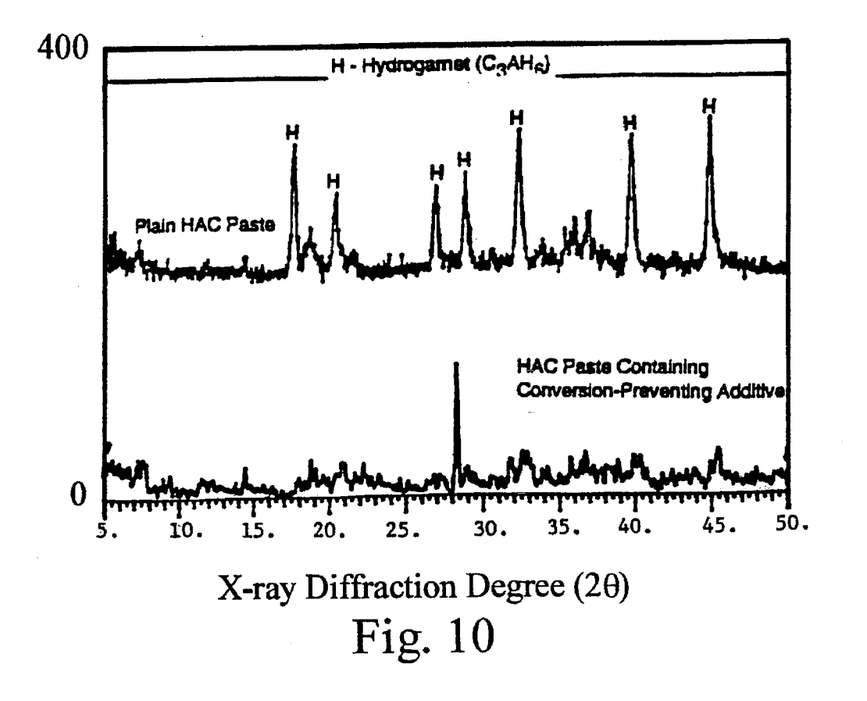

A cement paste comprising 50.7 wt. % high alumina cement, 10.1 wt. % natural zeolite from New Mexico, 2.3 wt. % potassium carbonate and 36.8 wt. % water was water-cured at 38° C. X-ray diffraction analysis was carried out on the wet sample at 250-day hydration. Little hydrogarnet ($C_3AH_6$) peaks were detected as shown in the XRD spectra of FIG. 10.

Example 11

A conversion-preventing additive containing 86.3 wt. % natural zeolite from Western Canada and 14.7 wt. % sodium sulphate was used. The cement mortar comprising 23.3 wt. % high alumina cement, 64.1 wt. % river sand, 2.3 wt. % conversion-preventing additive and 10.3 wt. % water was moist-cured at 23° C. for one day and then water-cured at 38° C. The 1-day, 14-day, 28-day and 180-day strengths were 42, 42, 51 and 52 MPa respectively.

Example 12

A conversion-preventing additive containing 91.0 wt. % calcined zeolite from Western Canada and 9.0 wt. % sodium sulphate was used. The zeolite was calcined at 800° C. for 2 hours. The cement mortar comprising 22.6 wt. % high alumina cement, 62.2 wt. % river sand, 4.5 wt. % conversion-preventing additive and 10.6 wt. % water was moist-cured at 23° C. for one day and then water-cured at 38° C. The 1-day, 14-day and 28-day strengths were 49, 61 and 64 MPa respectively.

Example 13

A conversion-preventing additive containing 86.2 wt. % natural zeolite from New Mexico, USA and 13.8 wt. % sodium sulphate was used. The cement mortar comprising 23.2 wt. % high alumina cement, 63.9 wt. % river sand, 2.7 wt. % conversion-preventing additive and 10.2 wt. % water was moist-cured at 23° C. for one day and then water-cured at 38° C. The 1-day, 14-day, 28-day and 180-day strengths were 44, 49, 57 and 65 MPa respectively.

Example 14

A conversion-preventing additive containing 95.5. wt. % calcined zeolite from New Mexico, USA and 4.5 wt. % sodium sulphate was used. The zeolite was calcined at 800° C. for 2 hours. The cement mortar comprising 22.5 wt. % high alumina cement, 61.9 wt. % river sand, 4.7 wt. % conversion-preventing additive and 10.8 wt. % water was moist-cured at 23° C. for one day and then water-cured at 38° C. The 1-day, 28-day and 180-day strengths were 62, 69 and 72 MPa respectively.

Example 15

A conversion-preventing additive containing 90.9 wt. % calcined zeolite from New Mexico, USA, and 9.1 wt. % sodium sulphate was used. The zeolite was calcined at 800° C. for 2 hours. The cement mortar comprising 21.7 wt. % high alumina cement, 59.8 wt. % river sand, 7.2 wt. % conversion-preventing additive and 11.4 wt. % water was moist-cured at 23° C. for one day and then water-cured at 38° C. The 1-day, 14-day and 28-day strengths were 45, 71 and 74 MPa respectively.

Example 16

A conversion-preventing additive containing 94.1 wt. % calcined zeolite from New Mexico, USA, and 5.9 wt. % sodium sulphate was used. The zeolite was calcined at 800° C. for 2 hours. The cement mortar comprising 20.6 wt. % high alumina cement, 56.7 wt. % river sand, 10.4 wt. % conversion-preventing additive and 12.2 wt. % water was moist-cured at 23° C. for one day and then water-cured at 38° C. The 1-day, 14-day and 28-day strengths were 40, 64 and 74 MPa respectively.

Example 17

A conversion-preventing additive containing 95.2 wt. % natural zeolite from Western Canada and 4.8 wt. % sodium silicate was used. The cement mortar comprising 22.0 wt. % high alumina cement, 60.6 wt. % river sand, 4.6 wt. % conversion-preventing additive, and 12.7 wt. % water was moist-cured at 23° C. for one day and then water-cured at 38° C. The 1-day, 28-day and 90 day strengths were 29, 41, and 52 MPa respectively.

Example 18

A conversion-preventing additive containing 93.0 wt. % natural zeolite from Western Canada and 7.0 wt. % sodium metaphosphate was used. The cement mortar comprising 22.0 wt. % high alumina cement, 60.6 wt. % river sand, 4.7 wt. % conversion-preventing additive, and 12.7 wt. % water was moist-cured at 23° C. for one day and then water-cured at 38° C. The 1-day, 28-day and 90 day strengths were 30, 45, and 55 MPa respectively.

Example 19

A conversion-preventing additive containing 90.6 wt. % natural zeolite from New Mexico, USA, and 9.4 wt. % sodium carbonate was used. The cement mortar comprising 22.6 wt. % high alumina cement, 62.1 wt. % river sand, 3.6 wt. % conversion-preventing additive and 11.7 wt. % water was moist-cured at 23° C. for one day and then water-cured at 38° C. The 1-day, 14-day, 28-day and 150-day strengths were 40, 53, 57 and 57 MPa respectively.

Example 20

A conversion-preventing additive containing 86.3 wt. % natural zeolite from California, USA and 13.7 wt. % sodium sulfate was used. The cement mortar comprising 23.2 wt. % high alumina cement, 63.9 wt. % river sand, 2.7 wt. % conversion-preventing additive, and 10.2 wt. % water was moist-cured at 23° C. for one day and then water-cured at 38° C. The 1-day, 14-day 28-day and 180 day strengths were 60, 59, 57 and 72 MPa respectively.

Example 21

A conversion-preventing additive containing 93.8 wt. % granulated blast-furnace slag and 6.2 wt. % sodium sulphate was used. The cement mortar comprising 21.8 wt. % high alumina cement, 59.9 wt. % river sand, 7.0 wt. % conversion-preventing additive and 11.3 wt. % water was moist-cured at 23° C. for one day and then water-cured at 38° C. The 1-day, 14-day, 28-day and 150-day strengths were 40, 51, 52 and 53 MPa respectively.

Example 22

A conversion-preventing additive containing 93.8 wt. % type F fly ash and 6.2 wt. % sodium sulfate was used. The cement mortar comprising 21.8 wt. % high alumina cement, 59.9 wt. % river sand, 7.0 wt. % conversion-preventing additive, and 11.3 wt. % water was moist-cured at 23° C. for one day and then water-cured at 38° C. The 1-day, 14-day 28-day and 150 day strengths were 33, 41, 51 and 63 MPa respectively.

Example 23

A conversion-preventing additive containing 93.8 wt. % Type C fly ash and 6.2 wt. % sodium sulphate was used. The cement mortar comprising 21.8 wt. % high alumina cement, 59.9 wt. % river sand, 7.0 wt. % conversion-preventing additive and 11.3 wt. % water was moist-cured at 23° C. for one day and then water-cured at 38° C. The 1-day, 14-day, 28-day and 120-day strengths were 38, 51, 52 and 67 MPa respectively.

Example 24

A conversion-preventing additive containing 90.9 wt. % natural zeolite from Western Canada and 9.1 wt. % sodium nitrate was used. The cement mortar comprising 22.5 wt. % high alumina cement, 61.8 wt. % river sand, 4.9 wt. % conversion-preventing additive and 10.8 wt. % water was moist-cured at 23° C. for one day and then water-cured at 38° C. The 1-day, 14-day, 28-day and 150-day strengths were 34, 50, 52 and 63 MPa respectively.

Example 25

A conversion-preventing additive containing 93.0 wt. % natural zeolite from Western Canada and 7.0 wt. % sodium nitrate was used. The cement mortar comprising 23.0 wt. % high alumina cement, 63.2 wt. % river sand, 4.9 wt. % conversion-preventing additive, 0.3% wt. % sodium sulfonated melamine formaldehyde (superplasticizer) and 8.5 wt. % water was moist-cured at 23° C. for one day and then water-cured at 38° C. The 1-day, 14-day 28-day and 150-day strengths were 42, 61 74 and 79 MPa respectively.

Example 26

A conversion-preventing additive containing 93.0 wt. % natural zeolite from Western Canada, 3.7 wt. % sodium nitrate and 3.3 wt. % sodium sulfate was used. The cement mortar comprising 22.5 wt. % high alumina cement, 61.9 wt.

% river sand, 4.8 wt. % conversion-preventing additive, and 10.8 wt. % water was moist-cured at 23° C. for one day and then water-cured at 38° C. The 1-day, 14-day 28-day and 150 day strengths were 40, 51, 50 and 71 MPa respectively.

Example 27

A conversion-preventing additive containing 93.0 wt. % natural zeolite from Western Canada and 7.0 wt. % sodium nitrate was used. The cement mortar comprising 22.7 wt. % high alumina cement, 62.3 wt. % river sand, 4.9 wt. % conversion-preventing additive, 0.3% wt. % sodium sulfonated melamine formaldehyde (superplasticizer) and 9.8 wt. % water was moist-cured at 23° C. for one day and then water-cured at 38° C. The 1-day, 14-day 28-day and 150 day strengths were 42, 54, 68 and 79 MPa respectively.

Example 28

A conversion-preventing additive containing 96.8 wt. % metakaolin and 3.2 wt. % sodium sulfate was used. The cement mortar comprising 21.8 wt. % high alumina cement, 60.0 wt. % river sand, 6.8 wt. % conversion-preventing additive and 11.4 wt. % water was moist-cured at 23° C. for one day and then water-cured at 38° C. The 1-day, 21-day, and 28-day strengths were 42, 59 and 60 MPa respectively.

A comparison between HAC compositions according to BRE concept (containing a pozzolan but not the inorganic salts) and analogous HAC compositions of the invention is given in Table 1.

TABLE 1

Comparison between BRE concept and the present invention

Figure 11:
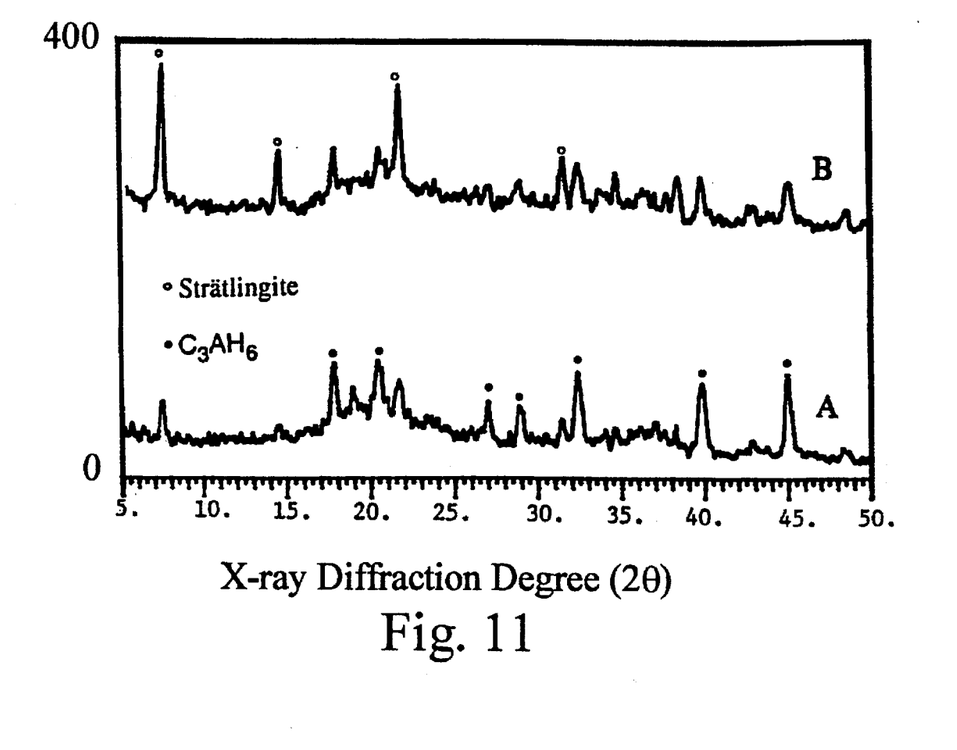
FIG. 11 illustrates for comparison XRD spectra showing hydrogarnet intensity of an exemplary HAC paste containing A) a pozzolan without an inorganic salt, and B) the pozzolan with an inorganic salt of the invention.

| Properties | BRE Concept | IRC Invention |
|---|---|---|
| Component | Granulated blast-furnace slag (GBS) | 1) Pozzolans, such as zeolite, slag, flyash, silica fume and metakaolin  2) Inorganic salts containing sodium and potasium ions |
| Minimum content of pozzolans required to prevent conversion of HAC (mass % of HAC) | 100 | 10 |
| Minimum content of inorganic salts (mass % of HAC) | None | 1 |
| Significance of inorganic salts in preventing conversion from $CAH_{10}$ or $CA_2AH_8$ to cubic $C_3AH_6$ in HAC paste | $C^3AH_6$ peak intensities (XRD) are high in HAC paste containing 30% GBS water cured at 38° C. for 28 days (FIG. 11, spectr.A) | $C_3AH_6$ peak intensities (XRD) are greatly reduced in HAC paste containing 30% GBS and 4.75% sodium sulfate water-cured at 38° C. for 28 days (FIG. 11, spectr.B) |
| One-day compressive strength | Low (about 40 MPa) | High (up to 60 MPa) |

CONCLUSIONS

It is evident from the above examples and illustrating drawings that satisfactory one-day strengths, above 30 MPa were achieved by using the additive of the invention, combining a pozzolan and an inorganic sodium or potassium salt, in high alumina cement compositions. The exaxmples in conjunction with the drawings show that hydrogarnet formation is significantly reduced in compositions containing the additive of the invention (with the inorganic salts).

It should be recognized that the maximum amount of the conversion-preventing additive in the HAC compositions of the invention is practically limited only by the one-day strength of the resulting composition, which decreases as the amount of additive increases. For that reason, the preferable upper content limit of the additive is about 20% by weight of HAC in the composition.

We claim:

1. A method of preventing strength reduction due to conversion from hexagonal calcium aluminate hydrates to cubic tricalcium aluminate hydrates in a high alumina cement composition comprising high alumina cement, the method comprising, mixing from about 10% to about 100% by weight of the high alumina cement composition with a conversion-preventing additive which comprises 80–99 wt. % of a siliceous pozzolan and 1–20 wt. % of at least one inorganic salt having sodium or potassium cation and an anion selected from the group consisting of sulfate, carbonate, nitrate, silicate, phosphate, chloride, and bromide, wherein the resulting high alumina cement composition is such that, upon water hydration at 25°–40° C., stratlingite is formed preferentially and a formation of cubic hydrogarnet is limited therein, whereby the compressive strength of said resulting composition undergoes little or no reduction between its one-day value and its 28-day value.

2. The method according to claim 1 wherein hydration of said siliceous pozzolan is activated by said inorganic salt.

3. The method of claim 1 wherein said siliceous pozzolan is at least one material selected from the group consisting of: zeolites, calcined zeolites, granulated blast-furnace slag, fly ash, silica fume, rice hull ash and metakaolin.

4. The method of claim 3 where said siliceous pozzolan is a calcined zeolite which is prepared by calcining a zeolite in a temperature from about 650° C. to about 1000° C. for 1–3 hours.

5. A high alumina cement composition which comprises high alumina cement and from about 10% to about 100% by weight of the high alumina cement, of a conversion preventing additive which comprises 80–99 wt. % siliceous pozzolan and 1–20 wt. % of at least one inorganic salt having a sodium or potassium cation and an anion selected from the group consisting of sulfate, carbonate, nitrate, silicate phosphate, chloride, and bromide, the composition being such that upon hydrarich, stratlingite is preferentially formed in said composition and a formation of cubic hydrogarnet is limited, whereby the compressive strength of said resulting composition undergoes little or no reduction between its one-day value and its 28-day value.

6. The composition according to claim 5 further comprising one or more chemical admixtures selected from the group consisting of: water reducer, superplasticizer, air-entraining agent and retarder, in amounts effective to improve or modify the properties of said fresh and/or hardened high alumina cement composition.

7. The composition according to claim 5 having one-day compressive strength in the range 35–65 MPa when moist-cured at 23° C.

8. The composition according to claim 5 wherein the content of the additive is from about 10% to about 20% by weight of the high alumina cement.

* * * * *